UNITED STATES PATENT OFFICE.

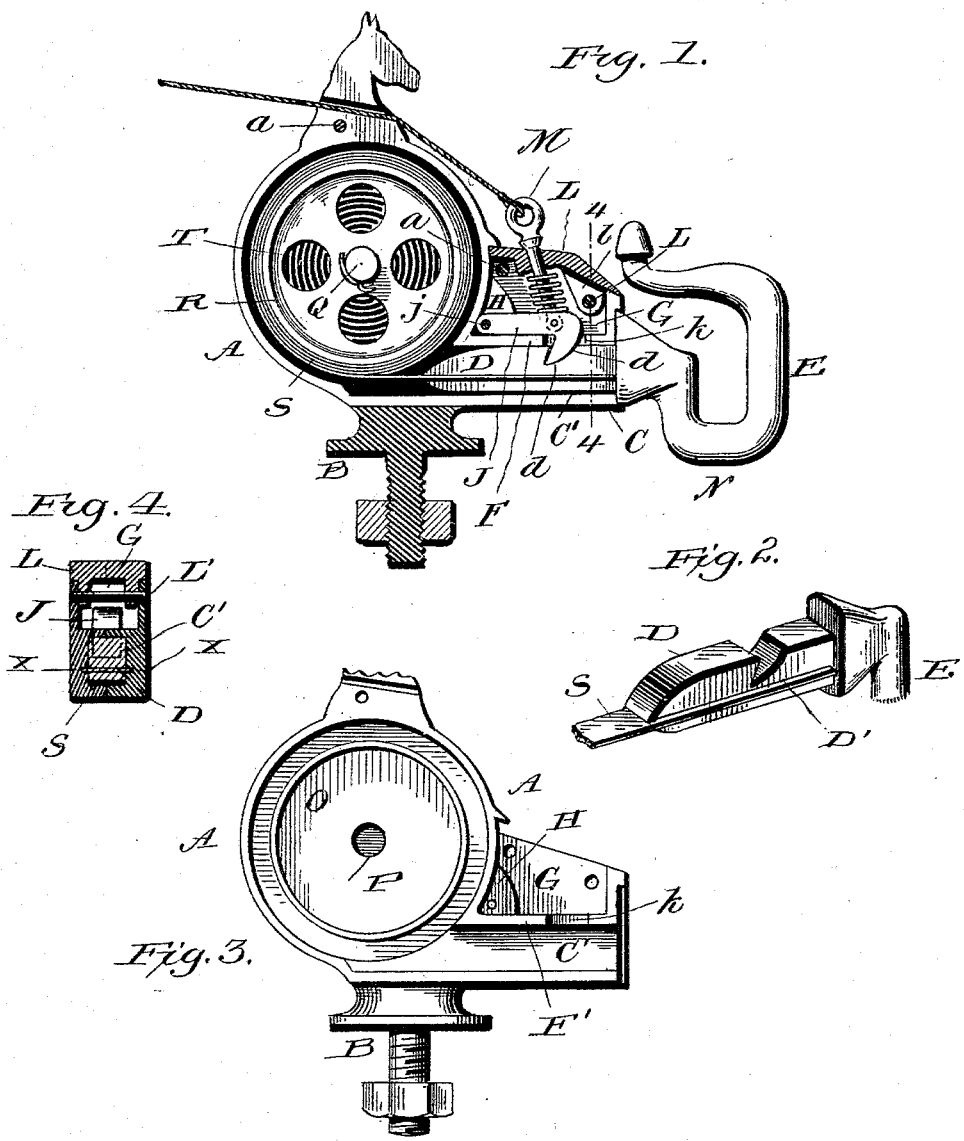

WILLIAM H. FERRIS AND JOHN P. HART, OF CADWALLADER, PENNSYLVANIA.

UNCHECKING-HOOK.

SPECIFICATION forming part of Letters Patent No. 561,780, dated June 9, 1896.

Application filed March 12, 1896. Serial No. 582,945. (No model.)

*To all whom it may concern:*

Be it known that we, WILLIAM H. FERRIS and JOHN P. HART, citizens of the United States, residing at Cadwallader, in the county of Fayette and State of Pennsylvania, have invented certain new and useful Improvements in Unchecking-Hooks; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to certain new and useful improvements in devices for unchecking horses, and especially to a water-hook, by which a horse, when harnessed to a buggy, may be unchecked by the operator's pulling on a cord which is within easy reach of the driver, and after the animal has finished drinking to automatically lock the check-hook to a holder on the harness.

It is our aim in the present invention to generally improve upon the construction of check-hook upon which we were granted a patent, No. 546,514, by which the cost of manufacture of the hook is materially decreased and the construction simplified.

To these ends and to such others as the invention may pertain, the same consists, further, in the novel construction, combination, and adaptation of the parts, as will be hereinafter more fully described, and then specifically defined in the appended claim.

We fully illustrate our invention in the accompanying drawings, which, with the letters of reference marked thereon, form a part of this specification, and in which drawings similar letters of reference indicate like parts throughout the several views, in which—

Figure 1 is a side elevation of a section of the hook embodying our invention, parts being shown in section. Fig. 2 is a detail view of the hook, showing the steel band attached thereto. Fig. 3 is a detail view of one of the two complemental parts of the shell, showing parts in relief. Fig. 4 is a section on line 4 4 of Fig. 1.

Reference now being had to the details of the drawings by letter, A designates the two-part shell mounted on a shank portion B, which is provided with a screw-threaded end to be screwed into the saddle of the harness. The said complemental shell portions each have extended portions C, recessed at C', forming with the two recesses, when the shells are fastened together, a socket in which the shank portion D of the hook E is adapted to be seated and locked therein. A dividing-partition F on each portion A forms the bottom of the recess G, in which is pivoted between the shoulders H the dog J on the pin *j*, the said shoulders serving also as guides for the dog, and the hooked end of the said dog rests normally in the aperture *k* in the said partition with its lower end in the path of the shank portion of the hook and adapted to engage in the notch *d* therein. A plate L, having ears *l*, is provided to close the recess G, and M is a spring-actuated pin with its lower end pivoted to the outer end of the dog for the purpose of raising the dog from engagement with the notch in the shank portion of the check-hook when it is desired to allow the horse to lower its head. A pin L' holds the said plate in place, which pin passes through apertures in the shell portions and the said eyes A. The check-hook has a downwardly-extending portion at N, then rises vertically, and then turns rearwardly, with its free end resting near the edge of the plate L, thus securely holding the check-strap from being unhooked, while the hook is locked in the said socket.

Each shell portion A has on its inner face an integral annular extension O and is recessed at P to receive an end of the shaft Q, on which is carried the pulley R, the recesses in each shell portion forming bearings for the said shaft. To the circumference of the pulley R, which has a somewhat broadened face, is secured one end of the steel tape S, which is wound about the said wheel's circumference and its other end fastened to the shank portion of the hook in the longitudinal slot D'. The said steel tape, as it is fed out and wound again, works through the slots X in the side walls of the portions A, thus guiding the same and preventing dirt from getting beneath the tape or ribbon.

Springs T are carried within the space inclosed by the annular extensions O, each spring having an end secured to the shaft on each side of the pulley, its other end secured to the inner circumference of the extension. These springs are preferably flush with the annular extensions, and when the two shell portions A are placed together and fastened by the screws $a$ the face of the said pulley will rest a portion of its width between the annular extension and the outer circular wall of the shell portion, thus making the device as narrow as possible.

A cord for raising the dog may be attached to the pin, which is pivoted to the dog, thence passed through the ornamental horse head on the shell, and attached at any convenient distance from the driver.

It will be observed by the peculiar construction of the hook for holding the check-strap that the draft on the same is on the bottom, thus causing the tape or strap to pull straight.

Having thus described our invention, what we claim to be new, and desire to secure by Letters Patent, is—

In combination with the two complemental shell portions A, with pulley and shaft mounted therein, the check-hook having an elongated horizontal slot in its shank portion, a tape having one end secured in said slot, its other end fastened to the circumference of the said pulley, the guide-slots X in which the tape is guided, and means for locking the hook to the shell, substantially as shown and described.

In testimony whereof we affix our signatures in presence of two witnesses.

WILLIAM H. FERRIS.
JOHN P. HART.

Witnesses:
T. A. SHARPNACK,
A. J. PERRY.